United States Patent

Bruns

[11] Patent Number: 5,580,479
[45] Date of Patent: Dec. 3, 1996

[54] HIGH-FREQUENCY INDUCTOR HEATING TUBE FOR SOLDER INJECTORS

[76] Inventor: Werner Bruns, Hohenhausstrasse 7, 76872 Freckenfeld, Germany

[21] Appl. No.: 428,218
[22] PCT Filed: Nov. 18, 1993
[86] PCT No.: PCT/EP93/03230
  § 371 Date: May 11, 1995
  § 102(e) Date: May 11, 1995
[87] PCT Pub. No.: WO94/11144
  PCT Pub. Date: May 26, 1994
[51] Int. Cl.⁶ .............................. H05B 6/10; B23K 3/06
[52] U.S. Cl. .......................... 219/616; 219/643; 219/674; 219/647; 228/53
[58] Field of Search ..................... 219/616, 643, 219/674, 85.1, 85.2, 85.21, 647; 228/51, 52, 53

[56] References Cited

U.S. PATENT DOCUMENTS 1,893,380  1/1933  Uschman et al. ................. 219/674
2,306,291 12/1942  Alons ............................ 219/674
2,620,433 12/1952  Denngen et al. ................. 219/674
2,810,168 10/1957  Nyborg .
5,231,267  7/1993  McGaffigan .................... 219/616

FOREIGN PATENT DOCUMENTS 244382  11/1987  European Pat. Off. .
3612341 10/1987  Germany .
3734550  4/1989  Germany .

*Primary Examiner*—Philip H. Leung
*Attorney, Agent, or Firm*—Horst M. Kasper

[57] ABSTRACT

The high-frequency inductor heating tube (1) for solder injectors is furnished as a hollow cylinder formed at one end as a cylindrical receiver tube. Windings of an inductor (2) are disposed over length of the cylindrical receiver tube. A solder injector (13) made of a highly heat-conducting base material and covered with a ferromagnetic layer (16) is inserted into the cylindrical receiver tube. Claws (8) of a wire spring (9) inserted into elongated holes (7) disposed in a wall of the cylindrical receiver tube lock the solder injector (13) in the cylindrical receiver tube.

11 Claims, 2 Drawing Sheets

HIGH-FREQUENCY INDUCTOR HEATING TUBE FOR SOLDER INJECTORS

BACKGROUND OF THE INVENTION

1. Field of the Invention

The invention relates to an inductor tube for solder injectors with high-frequency inductive heating.

2. Brief Description of the Background of the Invention Including Prior Art

The present invention provides for a high-frequency inductor heating tube for solder injectors. A hollow cylinder is made of a thermally insulating material and is formed at a first end of the hollow cylinder as a cylindrical receiver tube having a floor and an inner borehole having a first diameter. Windings of an inductor are disposed over a length of the cylindrical receiver tube and forming together with the hollow cylinder an exchangeable component. A solder injector is formed as an exchangeable part and has an outer diameter matching the first diameter of the inner borehole and made of a highly heat-conducting base material covered with a ferromagnetic layer and disposed in the cylindrical receiver tube.

According to the conventionally known equipment of high-frequency heated solder injectors, an insulated induction coil, furnished with terminal wires, which is designated in the following as the inductor, is a fixed component. According to the German patent DE 3734550 C2, the function and the properties of such an inductor are described in detail. The insulated application of an inductor to a metal core proves to be extremely difficult in the context of the production method and is thus expensive.

SUMMARY OF THE INVENTION

1. Purposes of the Invention.

Therefore, it is an object to provide for an inductor tube for receiving a plurality of differently structured solder injectors, where the solder injectors have the property of an as much as possible unlimited stability and lifetime.

These and other objects and advantages of the present invention will become evident from the description which follows.

BRIEF DESCRIPTION OF THE INVENTION

The manufacture of a device component, which is suitable both for receiving solder injectors of the same diameter in a tube furnished with coil and which is also furnished with a thermal insulator with a following electrical connection, gives the user an unlimited application in the soft soldering technique to be automated.

The thermal balance between the end points of this device component will quickly establish itself based on the selection of a suitable oxide ceramic material. This results in a negligible thermal flux in the direction of the connector part and in a small length of the device.

This inductor tube, which is a component which can be easily produced, allows the economic mass production of solder injectors, which can be formed to mere mold parts and which can be adapted application-specifically at a highest degree to the respectively desired application.

In addition, the handling is simplified to such a degree that only a plug-in motion is necessary for an exchange of a solder injector.

It becomes possible to furnish the solder injector, if desired, with a tubular needle based on the separate disposition of the inductor and of the injector, where the flux agent can be fed in a most exactly metered and measured way in small quantities through the tubular needle to the soldering face, formed like a cone section and wetted by the solder.

The thermal conductivity value between the ferromagnetic covering, serving as a heat source, and an enlarged soldering face at the solder injector can be influenced only by the copper cross-section.

While the coil-free solder injector is characterized in its economic availability, the mechanically stable inductor tube with the possibility for the direct connection to a coaxial soldering cable offers a nearly unlimited service life.

The soldering wire is guided axially in a spaghetti insulating tubing in a coaxial soldering cable, while two copper braids, electrically insulated from each other, cover and sheathe in a concentrical arrangement the spaghetti insulating tubing as in an inner conductor and an outer conductor and furnish the supply of the inductors with high-frequency energy.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

Figure 1:
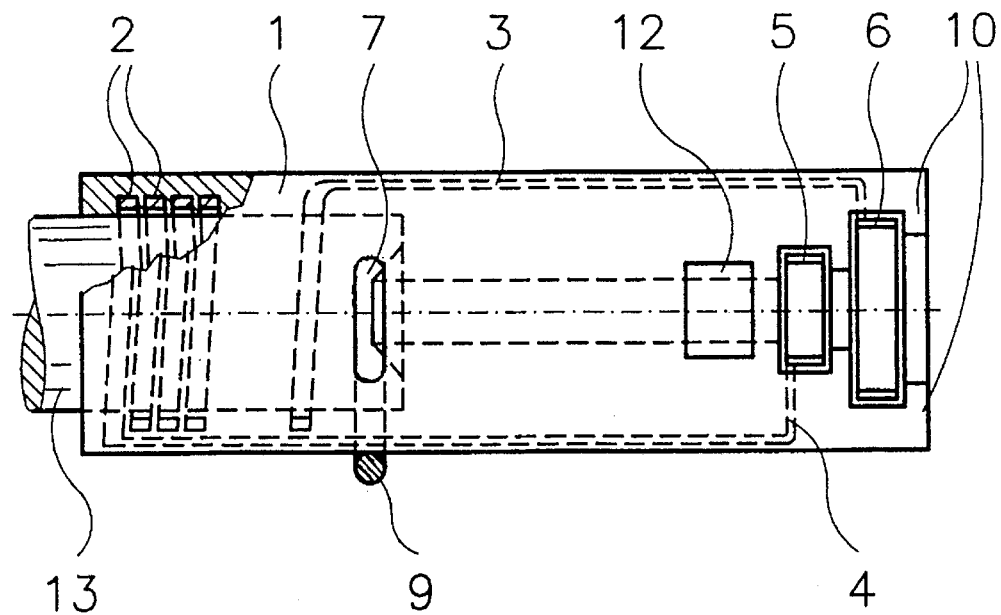
FIG. 1 is a view of an inductor tube.

FIG. 1 shows an inductor tube 1 as a hollow cylinder made of an oxide ceramic material. Zirconium oxide ($ZrO_2$) is for this purpose a preferred material with a high compression strength and thermal shock resistance.

The hollow cylinder exhibits sequentially in axial direction two boreholes with different diameters. The larger borehole is designated as a tube for the receiving of a solder injector 13, where the cylinder wall is dimensioned in this region in its thickness such that the windings of an inductor 2 are jacketed and covered by a sufficient covering and that the mechanical stability requirements are fulfilled. The inner covering meets only the electrical requirements relative to the insulation in view of the stray fields of the inductor which are to be kept small.

The small borehole is designed for receiving of the soldering wire and is furnished with a conical section at the transition position to the tube, wherein the conical section serves for the centering of the employed solder injector. The solder injector 13 is furnished on its back side with a hollow depression matched to the conical section.

The coil ends of the inductor 2 are guided in extension as conduits 3 and 4 in oppositely disposed grooves and are fed to open contact rings 5 and 6. The contact rings are preferably adapted to a coaxial soldering cable and are electrically connected to the soldering cable by soldering attachments at the inner conductor and at the outer conductor.

The contact rings 5 and 6 together with the soldering cable are secured in their position in case of a tensile load based on molded-on holding edges 10. A cable support sleeve made of light-gauge sheet metal surrounds the hollow cylinder 1 in the connection region as well as a piece of the soldering cable, whereas an inserted ceramic clamping piece 11 centers the cable. The shifting of the sleeve is prevented by an indented bead or crease disposed above the indentation 12.

A wire spring 9 is supported in two elongated holes 7 of the wall of the tube, wherein the elongated holes 7 are disposed opposite to the cylinder axis. The claws 8 of the wire spring 9 dip into the tube.

Figure 2:
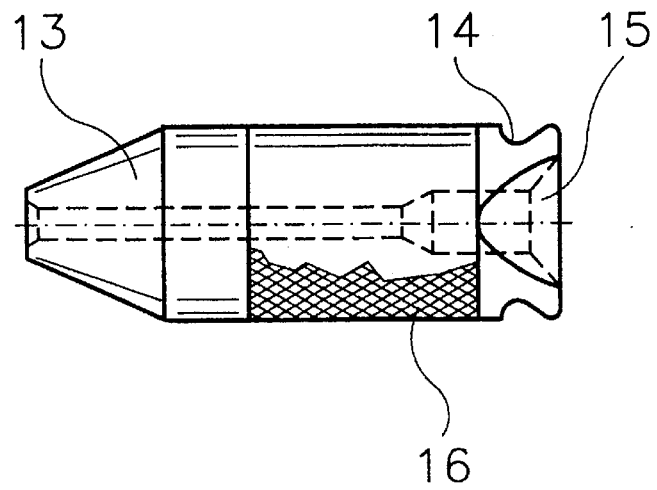
FIG. 2 is a view of a coil-free solder injector.
Figure 3:
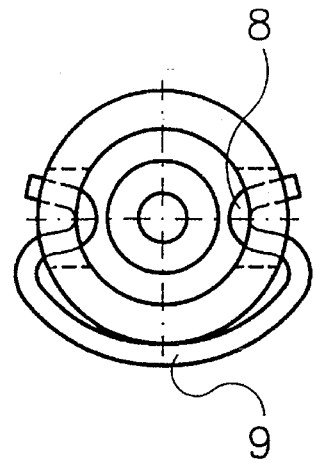
FIG. 3 is a schematic sectional view showing a wire spring.
Figure 4:
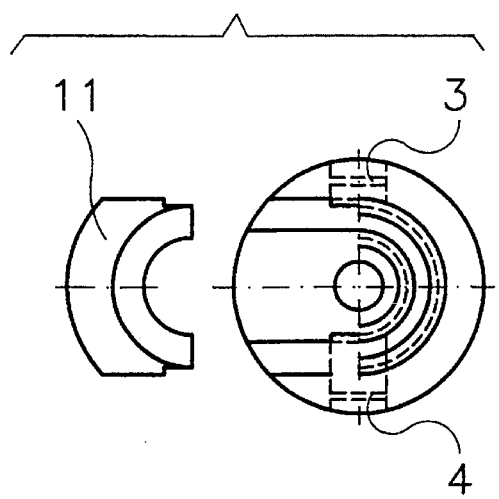
FIG. 4 is a schematic sectional view showing a ceramic clamping piece.
Figure 5:
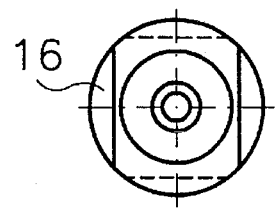
FIG. 5 is a side view of the coil-free solder injector shown in FIG. 2.

FIG. 2 shows a solder injector 13 as a soldering hollow tip made of a highly heat-conducting base material, for example, of copper or silver, where the solder injector 13 has to be furnished with a circumferential ferromagnetic covering layer 16 at least over the induction zone of the inductor. In addition, the solder injector 13 is furnished with two oppositely disposed insertion bevels 15 and with two grooves 14 disposed offset by 90 degrees relative to the insertion bevels. The insertion of the solder injector 13 into the tube is performed such that the insertion bevels 15 meet and impact the claws 8 and the spring 9 is tensioned based on the pressing in. In this position, the claws 8 themselves change their position from the insertion bevels 15 into the groove 14 upon a quarter turn of the solder injector. In this rest position, the claws 8 act onto the flanks of the grooves 14 such that a force-locking seat of the solder injector is effected on the ceramic cone. It will be understood that each of the elements described above, or two or more together, may also find a useful application in other types of high-frequency inductor heating tubes differing from the types described above.

While the invention has been illustrated and described as embodied in the context of a high-frequency inductor heating tube for solder injectors, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A high-frequency inductor heating tube (1) for solder injectors comprising:

a hollow cylinder made of a thermally insulating material and formed at a first end of the hollow cylinder as a cylindrical receiver tube having a floor and having an inner borehole defining a first diameter; windings of an inductor (2) disposed over a length of the cylindrical receiver tube and forming together with the hollow cylinder an exchangeable component; and a solder injector (13) formed as an exchangeable part and having an outer diameter matching the first diameter of the inner borehole of the cylindrical receiver tube and made of a highly heat-conducting base material covered with a ferromagnetic layer (16) and disposed in the cylindrical receiver tube.

2. The high-frequency inductor heating tube according to claim 1, wherein at a second end of the hollow cylinder is furnished with two differently sized, semicircular contacts (5, 6) for providing a cable connection, where the semicircular contacts (5, 6) are connected through conduits (3, 4) to windings of the inductor (2).

3. The high-frequency inductor heating tube according to claim 2, wherein the hollow cylinder receives the conduits (3, 4) protectively insulated in a center section of the hollow cylinder and disposed between the floor of the cylindrical receiver tube and a second end of the hollow cylinder, and wherein the center section is furnished throughout with an axial borehole, wherein the axial borehole exhibits an inner diameter matching a diameter of a soldering wire to be fed centered into the solder injector (13).

4. The high-frequency inductor heating tube according to claim 1 wherein the hollow cylinder is made of an oxide ceramic material, wherein a cylinder wall of the hollow cylinder encloses completely the windings of the inductor (2).

5. The high-frequency inductor heating tube according to claim 1, wherein two elongated holes (7) are furnished in a wall of the cylindrical receiver tube and are disposed on opposite sides relative to a hollow cylinder axis;

further comprising claws (8) of a wire spring (9) dipping into said two elongated holes (7) of the cylindrical receiver tube, wherein the solder injector (13) is locked in the cylindrical receiver tube by snapping in by way of the claws (8) of the wire spring (9) based on a spring action, wherein the solder injector is centered on a cone disposed at the floor of the cylindrical receiver tube and matched to a hollow depression furnished at an end of the solder injector.

6. Inductor tube for high-frequency inductive heating of solder injectors (13), furnished with a ferromagnetic covering layer (16), by way of an inductor (2) comprising solder injectors;

a hollow cylinder made of a thermally insulating material, wherein the hollow cylinder is furnished at one end with a cylindrical receiver tube, fitted to a mechanical support of the solder injectors, and wherein windings of the inductor (2) are disposed over the length of the cylindrical receiver tube; a spring having claws for engaging the hollow cylinder, wherein a locking of the solder injectors (13) in the receiver tube is effected by snapping in by way of the claws (8) of the spring (9), wherein the solder injectors are centered on a cone disposed at a floor of a receiver borehole based on spring action.

7. A high-frequency inductor heating tube (1) for solder injectors comprising:

a hollow cylinder made of a thermally insulating material and formed at a first end of the hollow cylinder as a cylindrical receiver tube having two elongated holes (7) furnished in a wall of the cylindrical receiver tube and disposed on opposite sides relative to an axis of the hollow cylinder and having a floor and an inner borehole having a first diameter;

windings of an inductor (2) disposed along the cylindrical receiver tube and forming together with the hollow cylinder an exchangeable component;

a solder injector (13) formed as an exchangeable part and having an outer diameter matching the first diameter of the inner borehole and made of a highly heat-conductive base material covered with a ferromagnetic layer (16) and disposed in the cylindrical receiver tube; and a wire spring (9) having claws (8) at both ends of the wire spring, wherein the claws (8) dip into said two elongated holes (7) of the cylindrical receiver tube, and wherein locking of the solder injector (13) in the cylindrical receiver tube is effected by snapping the claws (8) of the spring (9) based on a spring action.

8. The high-frequency inductor heating tube (1) for solder injectors according to claim 7, wherein the solder injector is furnished with two oppositely disposed insertion bevels and with two grooves disposed offset by 90 degrees relative to the insertion bevels.

9. The high-frequency inductor heating tube (1) for solder injectors according to claim 8, wherein the solder injector is formed such that the insertion bevels of the solder injector meet and impact the claws of the spring, and where the claws are formed to allow a change of position from the insertion bevels into the grooves.

10. The high-frequency inductor heating tube (1) for solder injectors according to claim 9, wherein the claws are formed to operate on flanks of the grooves for furnishing a force-locking seat of the solder injector on a ceramic cone.

11. The high-frequency inductor heating tube (1) for solder injectors according to claim 7, wherein the hollow cylinder is made of zirconium oxide ($ZrO_2$).

* * * * *